United States Patent Office 3,382,916
Patented May 14, 1968

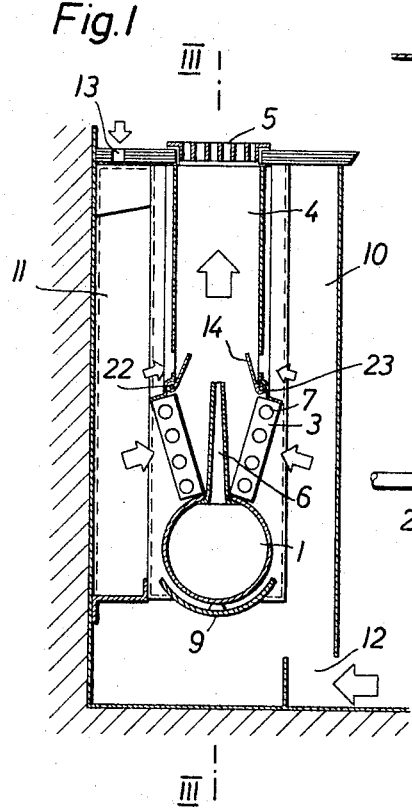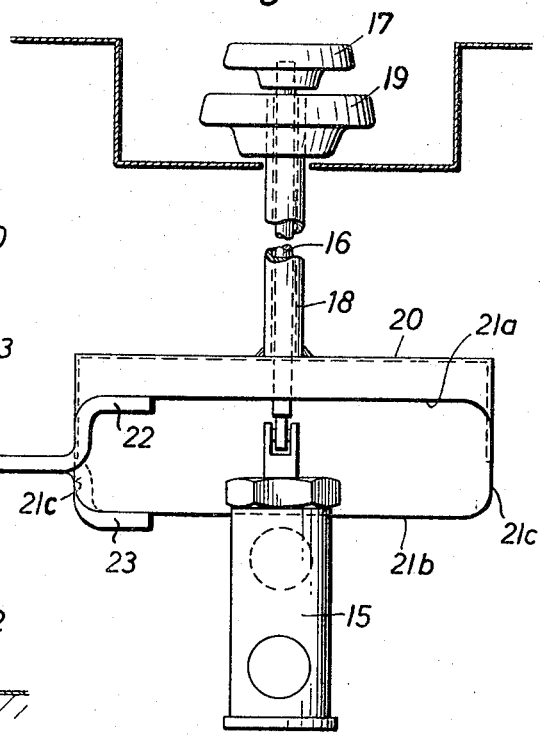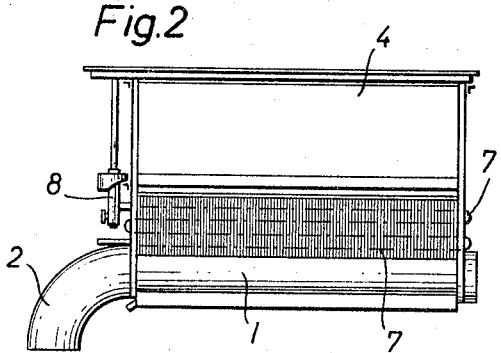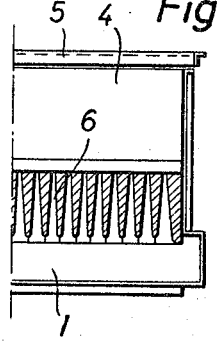

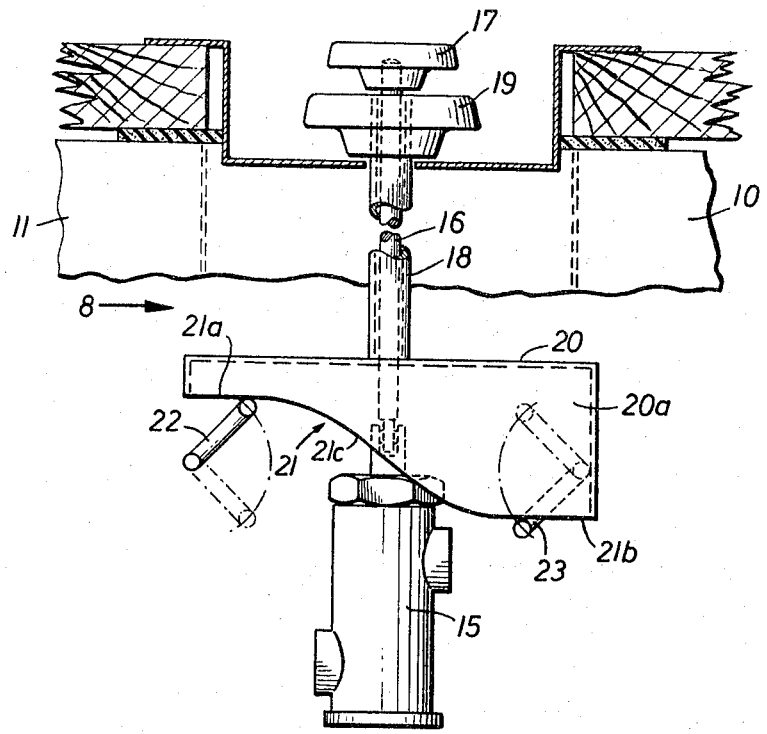
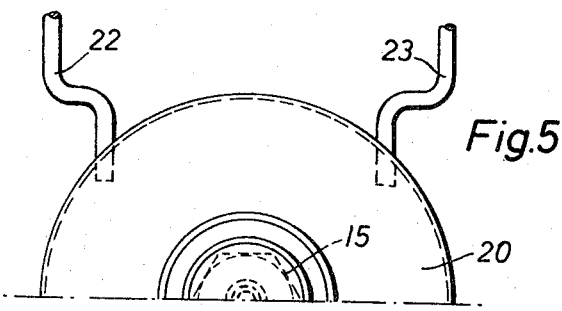

3,382,916
AIR-CONDITIONING APPARATUS
Hartmut Laux, Lowenich, near Cologne, Germany, assignor to Rox Lufttechnische Geratebau G.m.b.H., Cologne-Braunsfeld, Germany
Filed Aug. 26, 1965, Ser. No. 482,762
Claims priority, application Germany, Sept. 2, 1964, R 38,703
12 Claims. (Cl. 165—36)

ABSTRACT OF THE DISCLOSURE

An air-conditioning apparatus is provided utilizing a primary and a secondary source of air, the primary air passing through nozzles to a mixing chamber and the secondary air passing through heat exchangers disposed at the bottom of a mixing duct or shaft to receive substantially all air inflow in a lateral direction. Air flaps are provided for directing quantities of outside air to the shaft, by-passing the heat exchangers.

---

This invention relates to a novel air-conditioning apparatus, and is primarily concerned with a converter apparatus for high-pressure air-conditioning installations for cooling (or heating) rooms by convection.

Air-conditioning convectors used as induction means for high-pressure air-conditioning installations are constructed in many different forms. Generally, conventional systems include heat exchangers in conjunction with an air shaft, and a supply of high-pressure primary air. The heat exchanger, which may be arranged in inclined manner, is often situated directly in the air shaft. In another constructional form the heat exchanger is arranged transversely or in an inclined manner over the entire width of the air shaft, the high-pressure air supply chamber being arranged in the upper portion of the shaft and occupying a proportion of the shaft space. In such conventional convectors the induction ratio of secondary air to primary air is relatively low. The heat exchangers themselves are also comparatively large and bulky, and as a result, the flow speeds at the heat exchangers or exchanger fins are low. This low flow speed increases the risk of considerable fouling of the heat exchanger. In order to conteract the risk of fouling a secondary filtering is sometimes provided in the convector but this is disadvantageous from the standpoint of requiring additional maintenance and the output is often unsatisfactory.

In keeping with the above, it is a primary object of this invention to provide an air-conditioning convector operating as an induction means which is free of the aforesaid disadvantages, characterized in that in the convector apparatus the heat exchanger is arranged as the lower lateral boundary of the closed shaft and the nozzle outlet for the primary air is arranged at least at the upper end of the heat exchanger, and that the heat exchanger is given a low height in relation to the shaft width. The height of the heat exchanger corresponds merely to approximately the shaft width whereby the heat exchanger is advantageously kept narrow, and is arranged between the lower end of the closed shaft and the primary air supply in an inclined fashion. The primary air chamber is circular in cross-section and the primary air nozzle is of a length corresponding to the height of the heat exchanger.

The above construction of the air-conditioning convector effects important advantages among which is the fact that the low height of heat exchanger makes it possible to situate the nozzle mouth up to or above the upper edge of the heat exchangers. With this construction the stream of primary air issuing from the nozzle is surrounded by the solid walls of the shaft and circulation is thus highly efficient. The height of the closed shaft above the primary air nozzles is relatively greater than in conventional apparatus because of the low height of the heat exchangers, another factor which increases the quantity of air output and the efficient circulation or flow thereof. The primary air nozzles and shaft thus combine to form a jet apparatus (ejector) having a high degree of efficiency.

In accordance with this construction it is possible to keep the heat exchangers very narrow and as a result, a low specific resistance is achieved for the heat exchangers. By arranging the heat exchangers in inclined manner advantageous flow conditions are also permitted for the secondary air. Constructing and arranging the heat exchangers advantageously as far as flow conditions are concerned, and the particular arrangement of the ejector makes it possible to have very high air flow speeds through the exchanger fins. As compared with known constructional forms which provide the necessary heat and cold outputs by large exchanger surfaces (approximately four times those of the construction according to the present invention) and the use of low speeds of air-flow through the fins, in the construction according to the present invention the high flow speeds in the heat exchanger (approximately five times those of known constructional forms) obviate the undesirable depositing of dust on the exchanger. Dust particles are carried along in the air stream without being allowed any possibility of settling on the fins of the heat exchanger. Furthermore, owing to the fact that the induction ratio of secondary air to primary air is approximately twice as high as in known constructional forms, the temperature difference between room air and supplied mixed air is kept within such narrow limits that even with considerable cold air output a satisfactory circulation of room air is guaranteed without any risk of undesirable draft phenomena. This makes it possible to limit the primary air supply to the amount of fresh air actually required by the room.

In a further development of the induction means a by-pass valve is arranged above the heat exchanger for direct connection of a secondary air shaft to a central air shaft. This valve is so arranged that in the fully open position it bears against the primary air nozzle. As a result the room air can enter directly into the closed air shaft and the heat exchangers are shut off to the air flow.

According to the invention there is also provided a control arrangement for the air-conditioning apparatus wherein the control for the by-pass valves and also the control of the throughflow valve for cooling (or heating) medium can be effected independently of each other. In this way it is possible to set the air flow and the cooling medium individually and in different ways for any desired operating condition. For example, it is possible to carry out a coarse pre-setting with the throughflow valve and to carry out fine regulation with the by-pass valve. Each control device can be adjusted from zero up to a maximum and vice versa independently of the other. Alternatively, any kind of intermediate adjustment is possible, it being possible to operate with a single hand in succession and also simultaneously if this seems desirable or expedient. The arrangement itself is simple in construction and space-saving. It permits any desired setting combination to be achieved.

The invention is hereinafter more fully described with reference to examples of embodiment which are illustrated in the drawings in which:

FIG. 1 is a diagrammatic cross-sectional view through the convector apparatus for high-pressure air-conditioning installations according to the invention, and illustrates the arrangement of various components thereof;

FIG. 2 is a front view of the apparatus, and illustrates one of a pair of heat exchangers of the apparatus;

FIG. 3 is a longitudinal sectional view taken generally along the line III—III of FIG. 1, and illustrates a primary air nozzle of the apparatus;

FIG. 4 is a fragmentary elevational view of a control arrangement for by-pass and water regulator valves at an air-conditioning convector of the apparatus, and illustrates a cam element for operating by-pass valves arranged above each of the pair of heat exchangers;

FIG. 5 is a plan view of the control arrangement of FIG. 4; and

FIG. 6 is a side view of the control arrangement of FIG. 4.

A convector apparatus constructed in accordance with this invention includes a primary air chamber 1 which extends over the entire length of the apparatus and is preferably of tubular form. A supply pipe 2 is connected to one end of the primary air chamber 1 (FIG. 2). Above the primary air chamber 1 there are arranged a pair of heat exchangers 3 above which is a shaft 4 which acts as a mixing chamber. The mixing chamber 4 terminates in an adjustable air admission grid 5.

The heat exchangers 3 are arranged in an inclined position, i.e. diverging outwardly and upwardly from the primary air chamber 1. The heat exchangers 3 seat upon the upper portion (unnumbered) of the primary air chamber 1 (FIG. 1). Primary air nozzles 6 are arranged in a row along a vertical plane taken through the axis of the primary air chamber or air-conditioning convector 1. The nozzles 6 are of a length at least equal to the height of the heat exchangers 3. The nozzle mouth (unnumbered) is preferably situated slightly above the upper edge of the heat exchangers 3. An elongated slot nozzle can be provided in lieu of the individual nozzles 6.

The inclined position of the heat exchangers 3 extends from the base of the nozzles 6 to the lower edges of the walls of the mixing chamber 4. Because of the circular cross-sectional configuration of the primary air chamber 1 and the inclined heat exchangers 6 opening into the shaft 4 space at a maximum width of the latter advantageous flow conditions are provided for secondary air which is drawn into the shaft 4 by the primary air flow. The heat exchangers 3 are provided with relatively considerable fin spacing (2.5 to 3 mm.), thereby presenting relatively little specific resistance to the flow of secondary air. The heat exchangers 3 are also of a relatively low height as compared to the height of the mixing chamber or convector apparatus 1, and are also relatively narrow (the depth of the heat exchangers in relation to their height amounts to an approximate 1:4 ratio).

The heat exchanger fins (unnumbered) are traversed by a sinuously coiled tubing 7 through which the cooling (or heating) medium flows. Regulation of the cooling medium is effected by a control valve 8 (FIG. 2) which is arranged at the front of the convector. A control rod for operating the valve 8 is connected to an adjusting rod of by-pass valves 14, as will appear more fully hereinafter. The primary air nozzles 6 are so arranged that they operate with a high outflow speed, for example about 16 m./sec. Due to the relatively small throughflow cross-section of the heat exchangers 3 and high flow speeds for the secondary air through these heat exchangers there is a relatively high induction ratio of secondary air to primary air (amounting to a secondary to primary ratio of about 6 to 1).

The primary air chamber 1 is arranged with the heat exchangers 3 and the mixing chamber 4 in a housing (unnumbered) in which are provided additional shafts 10 and 11. The shaft 10 which is adjacent the room to be cooled (or heated) is provided with a lower aperture 12. The other shaft 11 is provided with an upper aperture 13 so that the cold air descending from a window is fed directly to the convector 1. The by-pass valves 14 are, as was heretofore noted, arranged above the heat exchangers 3, and are so constructed that the valves 14 contact the nozzles 6 when fully opened so that the flow of secondary air through the heat exchangers 3 is inhibited.

A control arrangement for the convector is so constructed that a control valve 15 for the cooling (or heating medium) can be individually operated by means of a shaft 16 (FIGS. 4 and 6) and an associated operating knob 17. A sleeve 18 is in coaxial relationship with the shaft 16 and at an upper end is positioned an operating knob 19. A control element 20 is connected to a lower end of the sleeve 18. The control element 20 is a cam element and has a cylindrical cam 21 which cooperates with adjusting levers or rods 22 and 23 which are fixedly connected to the by-pass valves 14. The adjusting levers 22 and 23 bear against the cam 22 by means of resilient means (not shown), e.g. springs.

The control element 20 has a cylindrical skirt 20a whose rim forms a control cam having cam portions 21a and 21b of different but constant height which are connected to one another by transition portions 21c. By this arrangement it is possible to open or close both by-pass valves 14 or to partly open and partly close them, as desired, by operating the knobs 17 and 19 independently of one another.

What is claimed is:

1. Apparatus for high-pressure air-conditioning convection installations comprising:
   (a) a plurality of heat exchangers having an upper end, an air shaft, and a nozzle means providing a principal direction of flow of high-pressure primary air through said air shaft;
   (b) said heat exchangers mounted splayed in said air shaft and defining a lower lateral boundary of said air shaft to provide passage means receiving and guiding secondary air passing substantially laterally through each of said heat exchangers into said air shaft and also in a direction substantially laterally relative to said principal direction of flow of primary air through said air shaft;
   (c) said air shaft being substantially closed at its extreme lower end to a directly vertical passage of air;
   (d) said nozzle means having a length corresponding to the height of said heat exchangers and terminating adjacent said upper end of said heat exchangers to cause mixing of said primary air and said secondary air downstream of said nozzle means.

2. The apparatus according to claim 1 wherein said shaft constitutes a first air shaft and there are provided adjacent to the heat exchangers, second and third shafts, the second shaft having an inlet from below and the third shaft having an inlet from above.

3. The apparatus according to claim 1 wherein the primary air nozzle means includes a portion having a circular transverse cross-sectional configuration.

4. The apparatus according to claim 2 wherein said first air shaft defines a mixing chamber and the height of the mixing chamber is at least twice the height of the heat exchangers.

5. The apparatus according to claim 2 wherein the heat exchangers seat upon the primary air source at each side of the nozzle outlet.

6. The apparatus according to claim 2, wherein the heat exchangers are arranged at both sides of the nozzle outlet.

7. The apparatus according to claim 6, wherein a by-pass valve is positioned for direct communication between at least one of said second and third shafts and the mixing chamber, and said by-pass valve contacts the primary air source means in the open position thereof.

8. The apparatus according to claim 7, wherein adjusting means is provided for individually regulating the flow of a medium through the heat exchangers and for regulating the operation of the by-pass valves.

9. The apparatus according to claim 8, wherein the adjusting means includes a sleeve which surrounds a shaft-like member, and a control cam is coupled to one of said latter elements for adjusting of at least one of said valves.

10. The apparatus according to claim 9, wherein the control cam is a cylindrical cup-shaped element having an end cam rim bearing against adjusting levers of the by-pass valves.

11. The apparatus according to claim 10, wherein the configuration of the control cam is constant over predetermined angular regions but is at different heights with transition curve portions.

12. The apparatus of claim 1, wherein that portion of the nozzle having the smallest aperture size is at least as high as the uppermost portions of the heat exchangers.

References Cited

UNITED STATES PATENTS

| | | | |
|---|---|---|---|
| 2,783,979 | 3/1957 | Blum | 165—123 |
| 2,899,180 | 8/1959 | Allander et al. | 165—50 |
| 3,000,193 | 9/1961 | Crider | 165—86 |
| 3,018,088 | 1/1962 | Allander et al. | 165—123 |

ROBERT A. O'LEARY, *Primary Examiner.*

C. SUKALO, *Assistant Examiner.*